March 3, 1970 — D. W. TIBBOTT — 3,498,389
AUTOMATIC THROTTLE TORQUE-RESPONSIVE POWER TOOL
Filed July 3, 1968
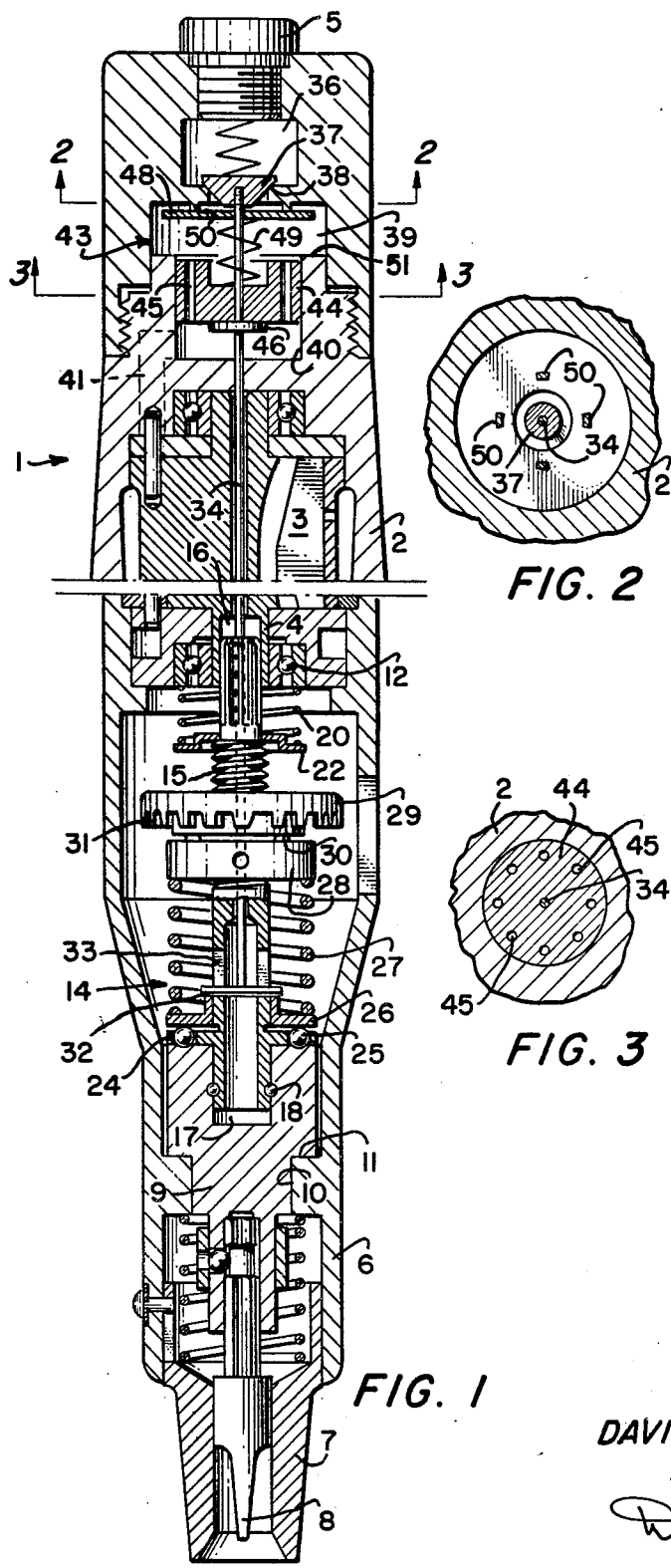
FIG. 1
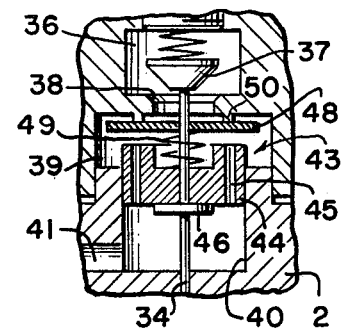
FIG. 4
FIG. 2
FIG. 3
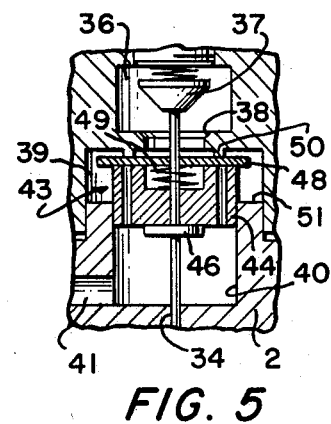
FIG. 5
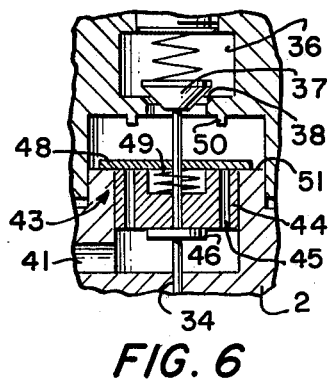
FIG. 6
INVENTOR.
DAVID W. TIBBOTT United States Patent Office 3,498,389
Patented Mar. 3, 1970

3,498,389
AUTOMATIC THROTTLE TORQUE-RESPONSIVE POWER TOOL
David W. Tibbott, Phillipsburg, N.J., assignor to Ingersoll-Rand Company, New York, N.Y., a corporation of New Jersey
Filed July 3, 1968, Ser. No. 742,281
Int. Cl. B23q 5/06; F01c 21/14
U.S. Cl. 173—12                           12 Claims

ABSTRACT OF THE DISCLOSURE

A fluid-operated rotary power tool having a motor supply valve means including first and second valves interconnected together for simultaneous movement. The valve means is movable from a first position to a second position wherein the first valve is open to admit motive fluid to the motor and to a third position wherein the second valve is closed to shut off the motive fluid. The valve means moves to the third position in response to the tool reaching a predetermined torque load.

BACKGROUND OF INVENTION

This invention relates to the art of power-operated rotary tools such as power screwdrivers and power wrenches.

It is conventional in the power tool art to provide a power wrench or screwdriver with a torque-responsive clutch which automatically releases the tool spindle from its motor when the torque load rises to a selected magnitude. It is also conventional in the air or fluid-operated power tool art to interconnect the torque-responsive clutch to the supply valve for the motor by a means that causes the valve to shut when the clutch releases. Prior tools accomplishing the above result have used a telescoping connection between the clutch and the valve and this connection is allowed to collapse when the clutch opens resulting in allowing the valve to close and stop the motor.

SUMMARY OF INVENTION

The principal object of this invention is to provide a new type of mechanism which accomplishes the above results and eliminates the telescoping connection between the clutch and the valve.

Other important objects of this invention are: to provide a novel supply valve mechanism for a power tool; to provide a simplified shut-off mechanism for an air-operated power tool; to provide a power tool valve mechanism having a first valve for opening the valve mechanism and a second valve for closing the valve mechanism; and to provide a two-valve fluid supply control for a power tool having a first valve which opens the fluid flow and a second valve which closes the fluid flow and remains closed during the return of the first valve to its closed position.

In general, the foregoing objects are attained in a fluid-operated tool having a valve means formed by first and second interconnected valves controlling the supply of motive fluid to the tool motor. The first valve is opened by moving the valve means from a first to a second position and means is provided for moving the valve means to a third position in response to the attainment of a predetermined torque load wherein the second valve closes to shut off the flow of motive fluid to the tool motor. Thereafter, the second valve remains closed while the first valve is returned to a closed position. Following the closing of the first valve, the second valve automatically opens to make the tool ready for another cycle.

BRIEF DESCRIPTION OF DRAWINGS

The invention is described in connection with the accompanying drawings wherein:

FIG. 1 is a longitudinal section of an air-operated power screwdriver employing a torque-responsive shut-off mechanism following the principles of this invention;

FIG. 2 is a fragmentary section taken on line 2—2 in FIG. 1;

FIG. 3 is a fragmentary section taken on line 3—3 in FIG. 1;

FIG. 4 is a fragment of FIG. 1 illustrating the air supply valve means of the tool motor in its open position;

FIG. 5 is a view similar to FIG. 4 illustrating the valve means immediately following an additional rearward movement of the valve means to its closed position to shut off air flow to the tool motor; and FIG. 6 is a view similar to FIG. 5 showing the valve means during its return movement to its starting position.

DESCRIPTION OF PREFERRED EMBODIMENTS

The power-operated screwdriver 1 shown in FIGS. 1 to 6 includes a casing 2 housing an air motor 3 having a drive shaft 4. The screwdriver 1 has an air hose fitting 5 threaded into the rear end of the casing 2 for coupling to an air hose (not shown) for feeding air to the tool. The front nose 6 of the screwdriver 1 carries a screw finder 7 and a screwdriving blade adapted to engage the slot of a screw. The blade 8 is detachably mounted in a spindle 9 which is rotatably formed in the interior of the casing. A bearing surface 10 carries a rearwardly facing shoulder 11 which engages a portion of the spindle 9 to limit its forward movement. The motor drive shaft 4 is mounted in the bearing 12. All of the foregoing structure is conventional in the screwdriver art.

The spindle 9 is interconnected to the motor drive shaft 4 by a torque responsive clutch mechanism 14 which releases under a predetermined torque load. The clutch mechanism 14 includes a hollow clutch shaft 15 having its rear end slidably splined in a socket 16 formed in the motor drive shaft 14. This connection allows the clutch shaft 15 to slide rearwardly into the socket 16 for a limited distance while maintaining a continuous driving connection therebetween.

The front end of the clutch shaft 15 is attached to the spindle 9 by a connection which allows the clutch shaft 15 to rotate relative thereto while being unable to slide axially relative to the spindle 9. This connection is formed by the front end of the clutch shaft 15 being seated in a rearwardly-opening bore 17 provided in the spindle 9 with several balls 18 being located in mating annular grooves formed in the clutch shaft 15 and the interior wall of the bore 17.

The clutch shaft 15 is urged forwardly by a light spring 20 engaged between the bearing 12 mounting the drive shaft 4 and a washer 22 resting on a rearwardly facing shoulder formed on the clutch shaft 15. As a result, the light spring 20 biases the spindle 9 against the shoulder 11 of the bearing 10. The clutch shaft 15 and spindle 9 are moved rearwardly in the tool by an operator forcing the tool blade 8 downwardly against a screw. The depth of the socket 16 in the drive shaft 14 limits the rearward movement of the clutch shaft 15.

The clutch shaft 15 carries an integral clutch plate 24 which contains a series of holes spaced around its center. These holes house corresponding clutch balls 25 adapted to seat in mating ball seats or recesses provided in the rear face of the spindle 9. The balls 25 are pressed into their seats in the spindle 9 by a presser ring 26 which is urged forward by a clutch spring 27. The rear end of the clutch spring 27 seats against a collar 28 which is keyed on the clutch shaft 15 and is held in place by a nut 29 threaded on the clutch shaft 15. A detent ball 30 is located in the rear face of the collar for seating in any of a series of cavities in the front face of the nut 29 to latch the nut 29 in its adjusted position. The nut 29 includes gear teeth 31 on its periphery for engaging with a "Jacobs" chuck key (not shown) to aid in turning the nut 29 to adjust the load on the clutch spring 27. The load on the clutch spring 27 will determine the magnitude of torque load at which the torque clutch 14 will release.

The presser ring 26 engages a cross bar 32 which slides in a diametrical slot 33 formed in the clutch shaft 15 and abuts the forward end of a push-rod 34 which extends rearwardly from the cross bar 32 through the hollow clutch shaft 15 and the drive shaft 4 of the motor 3. As a result of the foregoing arrangement, the disengagement of the clutch under torque will move the presser ring 26 rearwardly on the clutch shaft resulting in moving the push-rod 34 rearward.

The air fitting 5 extending from the rear end of the casing 2 opens into a first valve chamber 36 housing a first valve 37 resting on a stationary valve seat 38. The first valve 37 is attached to the rear end of the push-rod 34 and closes the top end of a second valve chamber 39. The second valve chamber 39 is located above a valve bore 40 which is connected to a motor supply passage 41, shown in dotted lines in FIG. 1, extending to the tool motor 3. The first valve 37 controls the flow of air from the first valve chamber 36 to the motor 3 via the second valve chamber 39, the bore 40 and the motor supply passage 41.

When the screwdriver is initially pressed downwardly on a screw, the spindle 9, the clutch shaft 15, push-rod 34 and first valve 37 move rearwardly in the tool to raise the first valve 37 above the stationary valve seat 38, as shown in FIG. 4, and allow air to flow through the motor supply passage 41 to the motor 3. This air will drive the motor 3, causing the screwdriver to drive the screw engaged by the blade 8.

As the screw is driven home, it will become tight and the torque load on the spindle 9 will rise until it reaches a predetermined torque load that will cause the clutch mechanism 14 to release and slip. The release of the clutch mechanism 14 is caused by the clutch balls 25 rolling out of their seats or pockets on the rear end of the spindle 9. The unseating movement of the clutch balls 25 forces the push-rod 34 and first valve 37 further rearwardly in the tool. This additional rearward movement of the push-rod 34 closes a second valve 43 which is carried on the push-rod 34, thereby shutting off the air flowing to the motor 3 and stopping the tool.

The second valve 43 includes a valve drum 44 slidably mounted in the valve bore 40 and on the push-rod 34. The valve drum 44 includes a series of longitudinal passages 45 spaced around its axis and extending between its ends. The valve drum 44 rests on an enlarged flange or abutment 46 fixed on the push-rod 34 whereby rearward movement of the push-rod 34 forces the valve drum 44 to move with it.

A valve plate 48 is slidably mounted on the push-rod at the rear of the valve drum 44 and is located in the second valve chamber 39. The valve plate 48 is adapted to abut the valve drum 44 thereby closing the drum passages 45. A spring 49 is located between the valve drum 44 and the valve plate 48 and urges these members apart to normally hold the second valve 43 open.

Several raised projections 50 project forwardly from beneath the valve seat 38 to prevent the valve plate 48 from engaging the front face of the valve seat 38 to interfere with the flow of air through the valve seat 38.

In the normal position of the screwdriver, prior to starting a screwdriver operation, the valves 37 and 43 are in the position shown in FIG. 1. The valve drum 44 is located slightly forward of the shoulder 51 located in the second valve chamber 39 with the valve plate 48 forced rearwardly against the projections 50. The second valve 43 is open in this position of the valve mechanism.

The second valve 43 including the valve drum 44 and the valve plate 48 remains open when the first valve 37 initially opens as shown in FIG. 4, caused by the operator pressing the screwdriver against a screw. At this time, the valve drum 44 remains spaced from the valve plate 48 a sufficient distance for the air to easily flow around the valve plate 48 and through the drum passages 45 without a pressure drop being created across the valve plate 48.

When the clutch mechanism 14 reaches its preset torque load and the clutch balls 25 roll out of their pockets, the push-rod 34 is moved rearwardly over an additional distance.

This additional rearward movement carries the valve drum 44 rearward to a point where it is very close to the valve plate 48. At this time the space between the valve drum 44 and valve plate 48 is so small that the plate interferes with the air flowing through the second valve chamber 39 enough to create a differential of pressure across the valve plate 48. This differential of pressure slams the valve plate 48 against the valve drum 44 to close the inlets to the drum passages 45, as shown in FIG. 5, thereby stopping the flow of air to the motor 3.

After the motor 3 of the screwdriver stops, the operator lifts the screwdriver 1 from the screw, thus allowing the spindle 9 to move forward to seat on the bearing shoulder 11. This movement allows the push-rod 34 and valve 37 to move forward until the valve 37 is again seated on the stationary valve seat 38. The forward movement of the valve 37 carries the valve drum 44 and valve plate 48 with it while both parts remain pressed together due to the air pressure behind the valve plate 48. This action will maintain the second valve 43 closed while the first valve 37 is being closed as a result of the forward movement of the push-rod 34.

Just before the end of the forward movement of the push-rod 34, the valve plate 48 engages the shoulder 51, at the forward end of the second valve chamber 39, to allow the valve drum 44 to move forwardly from the valve plate 48 for a slight distance. This position of the valve plate 48 is shown in FIG. 6.

After the first valve 37 is again seated on the valve seat 38, any air trapped in the second valve chamber 39 rapidly leaks out to allow the spring 49 to return the valve plate 48 to its rearward position resting against the projections 50, as shown in FIG. 1, ready for another cycle.

Although a single embodiment of the invention is illustrated and described in detail, it will be understood that the invention is not limited simply to this embodiment, but contemplates other embodiments and variations which utilize the concepts and teachings of this invention.

I claim:
1. A fluid-operated rotary power tool comprising:
   a casing;
   a fluid motor driving a spindle;
   a first valve controlling the flow of motive fluid to said motor and movable in one direction from a closed position to an open position to start said motor;
   a torque sensing means connected to said spindle to measure a predetermined load on said spindle and to create a signal;
   a second valve controlling the flow of motive fluid to said motor and connected to said first valve to move in unison with said first valve during movement of said first valve to said open position; and
   means operative, in response to said signal, to move said second valve to its closed position to shut off the flow of motive fluid to said motor.

2. A fluid-operated rotary tool comprising:
   a housing including a fluid-operated rotary motor;

a first valve controlling the flow of motive fluid to said motor and movable from a closed position to an open position wherein motive fluid flows to said motor;

a second valve controlling the flow of motive fluid to said motor and being connected to said first valve to move with it in moving to said open position; said second valve being open when said first valve is in its open position and being movable to a closed position to shut off the flow of motive fluid to said motor while said first valve remains open; and torque sensing means connected to said motor to measure the torque on said motor and being operative, in response to a predetermined torque load on said motor, to effect the movement of said second valve to its closed position.

3. The rotary tool of claim 2 wherein:

said second valve will remain closed during the return of said first valve to a closed position, said second valve automatically re-opening following the closing of said first valve.

4. A fluid-operated rotary tool including:

a fluid-operated motor; and valve means including first and second valves which are interconnected to move simultaneously from a first position, wherein said first valve shuts off the flow of motive fluid to said motor, to a second position, wherein said first and second valves allow motive fluid to flow to said motor, said valve means being movable from said second position to a third position different from said first position, wherein said second valve shuts off the flow of motive fluid to said motor.

5. The rotary tool of claim 4 including:

means operable by an operator for moving said valve means to said second position; and other means operative, in response to a predetermined torque load on the tool, to move said valve means to said third position.

6. A fluid-operated rotary tool comprising:

a housing including a fluid-operated rotary motor;

a spindle movable rearwardly in said housing;

valve means controlling the flow of motive fluid to said motor and movable rearwardly in said housing over a distance including first and second successive increments of travel, said valve means including a first valve which is open in response to the rearward movement of said valve means over said first increment of travel, thereby starting said motor, said valve means also including a second valve which is closed in response to the rearward movement of said valve means over said second increment of travel, thereby stopping said motor;

means interconnecting said spindle to said valve means to transmit the rearward movement of the spindle to the valve means for moving said valve means over said first increment of travel thereby to open said first valve; and torque sensing means connected to said motor to measure the torque on said motor and being operative, in response to the rise of the torque load to a predetermined torque load, to move said valve means over said second increment of its travel, thereby to close said second valve.

7. The rotary tool of claim 6 wherein:

said second valve is operative to remain closed during the return of said first valve to its closed position.

8. The rotary tool of claim 7 wherein:

said second valve automatically reopens after said first valve is closed.

9. The rotary tool of claim 6 wherein:

said tool includes a push-rod interconnecting the valve means to the spindle and operative to move said valve means rearwardly in response to an operator thrusting the tool forwardly against a workpiece.

10. The rotary tool of claim 6 wherein:

said second valve is closed by a differential of fluid pressure caused by the movement of said valve means over said second increment of travel.

11. The rotary tool of claim 10 wherein:

said second valve includes a body carried on a rod interconnected to said spindle, a longitudinal passage for conveying fluid through the body and a plate movably mounted on the rod and adapted to close said passage when subject to a differential of fluid; and means normally urging said plate away from said body to the open position of said second valve.

12. The rotary tool of claim 11 wherein:

said body is slidably mounted in the housing of said tool.

References Cited

UNITED STATES PATENTS

| | | | |
|---|---|---|---|
| 3,082,742 | 3/1963 | Vilmerding et al. | 81—52.4 |
| 3,162,250 | 12/1964 | Sindelar | 173—12 |
| 3,242,996 | 3/1966 | Wright et al. | 173—12 X |
| 3,298,481 | 1/1967 | Schaedler et al. | 192—150 X |
| 3,385,377 | 5/1968 | Amtsberg et al. | 173—12 |

ERNEST R. PURSER, Primary Examiner

U.S. Cl. X.R.

91—59; 173—15